(12) United States Patent
Yang et al.

(10) Patent No.: US 8,736,515 B2
(45) Date of Patent: May 27, 2014

(54) GRAPHICS CARD, MULTI-SCREEN DISPLAY SYSTEM AND SYNCHRONOUS DISPLAY METHOD

(75) Inventors: Xinwei Yang, Pleasanton, CA (US); Li Tao, Shanghai (CN); Yang Ke, Shanghai (CN)

(73) Assignee: Via Technologies, Inc., New Taipei (TW)

( * ) Notice: Subject to any disclaimer, the term of this patent is extended or adjusted under 35 U.S.C. 154(b) by 150 days.

(21) Appl. No.: 13/418,243

(22) Filed: Mar. 12, 2012

(65) Prior Publication Data
US 2013/0050158 A1 Feb. 28, 2013

(30) Foreign Application Priority Data

Aug. 23, 2011 (CN) .......................... 2011 1 0242316

(51) Int. Cl.
*G09G 5/00* (2006.01)
(52) U.S. Cl.
USPC .......................................................... 345/1.1
(58) Field of Classification Search
None
See application file for complete search history.

(56) References Cited

U.S. PATENT DOCUMENTS

| 8,436,786 B2 * | 5/2013 | Kamoto | 345/1.1 |
| 2011/0050709 A1 * | 3/2011 | Glen et al. | 345/501 |

FOREIGN PATENT DOCUMENTS

| CN | 102054427 | 5/2011 |
| CN | 101647273 | 9/2011 |
| TW | I258120 | 7/2006 |
| TW | I263925 | 10/2006 |

OTHER PUBLICATIONS

English language translation of abstract of TW I258120 (published Jul. 11, 2006).
English language translation of abstract of TW I263925 (published Oct. 11, 2006).
English language translation of abstract of CN 102054427 (published May 11, 2011).
English language translation of abstract of CN 101647273 (published Sep. 7, 2011).

* cited by examiner

*Primary Examiner* — Joseph Haley
(74) *Attorney, Agent, or Firm* — McClure, Qualey & Rodack, LLP

(57) ABSTRACT

A graphics card, a multi-screen display system and a synchronous display method are disclosed. The disclosed method includes the following steps. Firstly, first clock signals are provided in parallel in response to a first clock signal transferred from a motherboard. A second clock signal is generated according to one of the first clock signals that are provided in parallel, wherein the oscillation frequency of the first clock signals is larger than the oscillating frequency of the second clock signal. Then, a set of display clocks are generated based on the second clock signal. The set of display clocks control the display of a set of screens, for synchronous multi-screen display.

14 Claims, 6 Drawing Sheets

GRAPHICS CARD, MULTI-SCREEN DISPLAY SYSTEM AND SYNCHRONOUS DISPLAY METHOD

CROSS REFERENCE TO RELATED APPLICATIONS

This Application claims priority of China Patent Application No. 201110242316.8, filed on Aug. 23, 2011, the entirety of which is incorporated by reference herein.

BACKGROUND OF THE INVENTION

1. Field of the Invention

The present invention relates to multi-screen display technology, and in particular relates to a graphics card, a multi-screen display system and a synchronous display method.

2. Description of the Related Art

Because it is difficult to manufacture a large-sized panel, a video wall consisting of a plurality of screens is generally used to display a large picture. FIG. 1A depicts an exemplary embodiment of a video wall. As shown, a video wall 100 consists of multiple screens. The multiple screens may be controlled by a single or multiple graphics cards attached to a computer. In conventional multi-screen display systems, the multiple screens are typically controlled by more than one graphics cards. The graphics cards are connected by cables, as shown in FIG. 1B. When a clock signal Gen_CLK is generated by one of the graphics cards, the cables transfer the generated clock signal Gen_CLK to the remaining graphics cards to synchronously display images on the multiple screens.

The cables, however, occupy considerable space and complicate the overall design of the system. In a case wherein a large number of graphics cards are connected by cables, the clock signal Gen_CLK conveyed on the cables may be degraded, and may be interfered with by noise, and the synchronous display of the multiple screens may be badly affected. When the multiple graphics cards are driven by asynchronous clock signals, unsightly fissure may occur on the displayed image. Therefore, it is important to synchronize the multiple screens of the video wall 100.

BRIEF SUMMARY OF THE INVENTION

A graphics card, a multi-screen display system and a synchronous display method for multiple screens are disclosed.

A graphics card in accordance with an exemplary embodiment of the invention comprises a clock buffer, a clock synthesizer and a display chip. The clock buffer receives a first clock signal from a motherboard, and couples the first clock signal to several output terminals thereof in parallel. The first clock signal provided at one of the output terminals of the clock buffer is received by the clock synchronizer. The clock synchronizer generates a second clock signal according to the received first clock signal. Based on the second clock signal, the display chip controls multiple screens to display images and thereby achieve synchronous display on the multiple screens.

A multi-screen display system in accordance with an exemplary embodiment of the invention comprises a plurality of screens, a motherboard and a graphics card. The graphics card comprises a clock buffer, a clock synthesizer, and a display chip. The clock buffer receives a first clock signal from the motherboard, and couples the first clock signal to output terminals thereof in parallel. The first clock signal provided at one of the output terminals of the clock buffer is received by the clock synthesizer. The clock synthesizer generates a second clock signal based on the received first clock signal. Based on the second clock signal, the display chip controls the plurality screens to display images and thereby achieve synchronous display on the plurality of screens.

In accordance with an exemplary embodiment of the invention, a synchronous display method for multiple screens having one single graphics card includes the steps as below. In accordance with the disclosed method, a first clock signal is received from a motherboard and is coupled to a plurality of terminals in parallel, and a second clock signal is generated from the first clock signal at one of the plurality of terminals. The oscillation frequency of the first clock signal is greater than that of the second clock signal. Based on the second clock signal, a set of display clocks are generated to control a set of screens to display images and thereby achieve synchronous display on the set of screens.

In accordance with an exemplary embodiment of the invention, a synchronous display method for multiple screens, implemented within a multi-screen display system having a plurality of graphics cards includes the steps as below. According to the disclosed method, the graphics cards all receive a first clock signal from a motherboard, and each couples the received first clock signal to a plurality of terminals in parallel. In each graphic card, the first clock signal provided at one of the plurality of terminals therein is used to generate a second clock signal having a lower oscillation frequency than the first clock signal, and a set of display clocks are generated based on the second clock signal. Each graphics card uses the generated set of display clocks to control a set of screens corresponding thereto to display images and thereby achieve synchronous display on the set of screens. In this manner, all sets of screens controlled by all graphics cards within the multi-screen display system display images synchronously.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

This description is made for the purpose of illustrating the general principles of the invention and should not be taken in a limiting sense. The scope of the invention is best determined by reference to the appended claims.

Figure 1A:
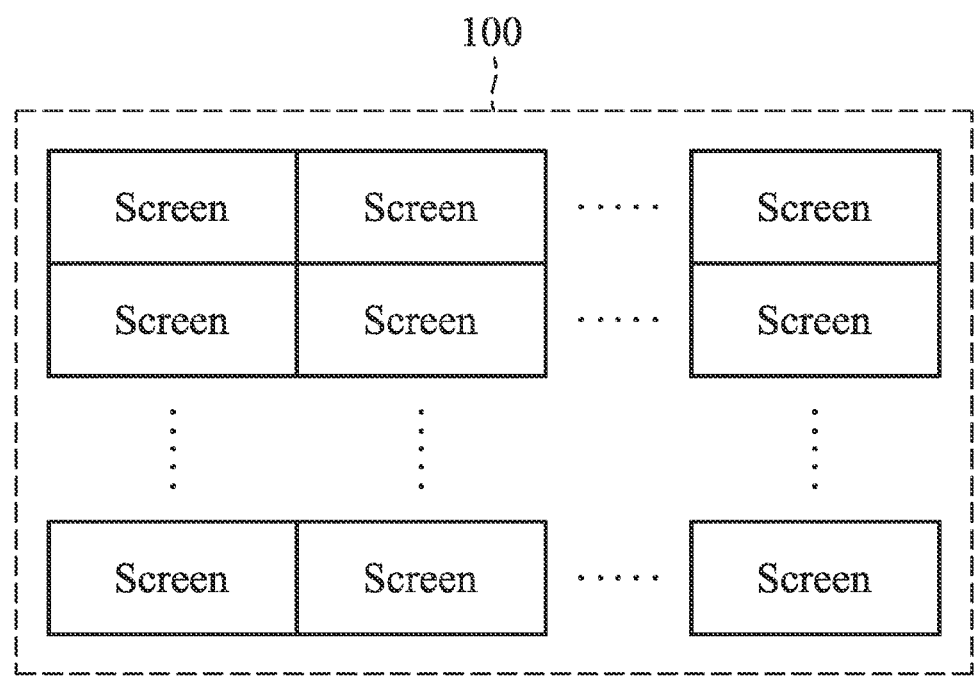
FIG. 1A depicts a video wall in accordance with an exemplary embodiment of the invention, the video wall 100 consists of a plurality of screens.
Figure 1B:
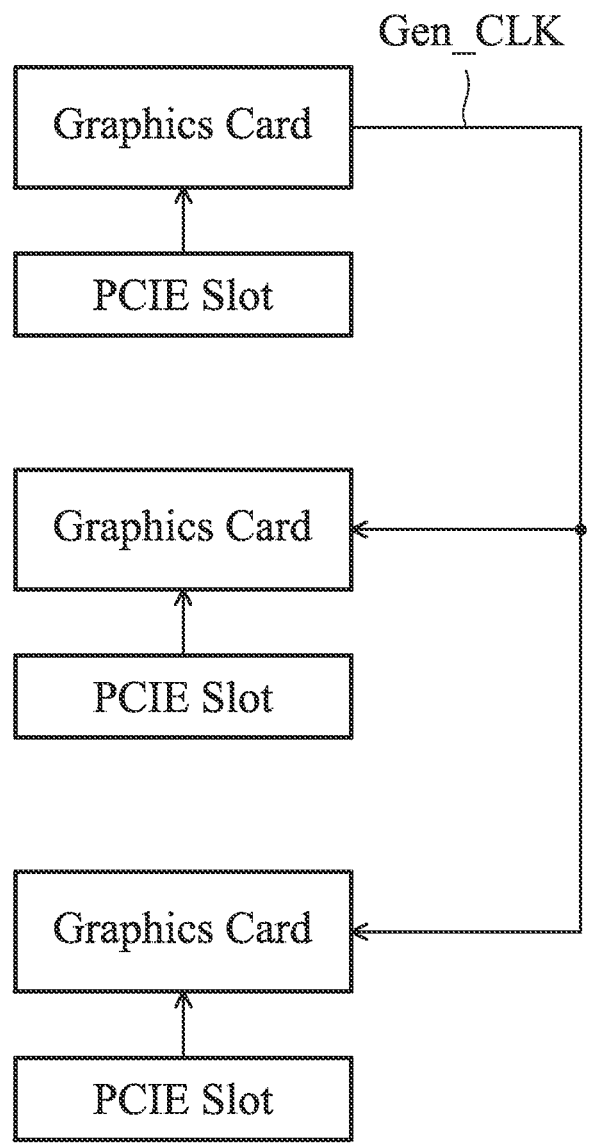
FIG. 1B depicts a conventional multi-screen display system, wherein the multiple screens of the video wall are controlled by a plurality of graphics cards, and, the graphics cards are connected by a cable conveying a clock signal Gen_CLK generated by one of the graphics cards and, based on the clock signal Gen_CLK conveyed on the cabled, the graphics cards control the multiple screens to display images synchronously.
Figure 2:
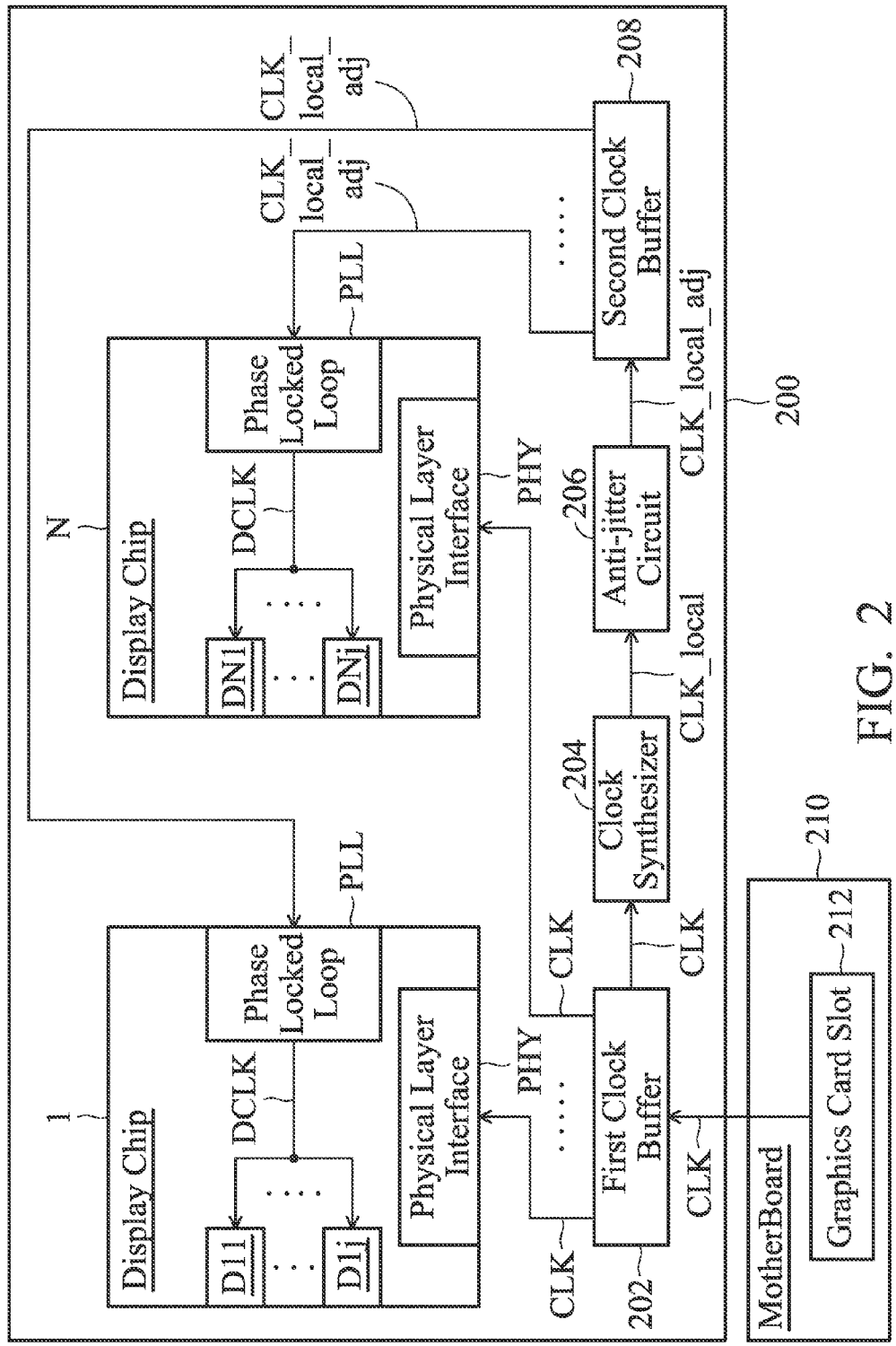
FIG. 2 depicts an exemplary embodiment of the invention, which comprises a graphics card 200.

FIG. 2 depicts a graphics card 200 in accordance with an exemplary embodiment of the invention, which is coupled to a motherboard 210. The graphics card 200 comprises a first clock buffer 202, a clock synthesizer 204, an anti-jitter circuit 206, a second clock buffer 208 and N display chips numbered from 1 to N.

Each display chip may comprise a physical layer interface PHY, a phase-locked loop PLL and a set of display control chips (e.g., a set of display control chips D11 to D1j for the display chip 1 . . . and a set of display control chips DN1 to DNj for the display chip N).

As shown in FIG. 2, the graphics card 200 is attached to a graphics card slot 212 on the motherboard 210. The graphics card slot 212 may be any slot for graphics cards, such as a peripheral component interconnect express (PCIE) slot.

The signals transferred to the graphics card 200 from the motherboard 210 via the graphics card slot 212 contain a clock signal CLK, which acts as a reference for communication between the graphics card 200 and the motherboard 210. For example, when the graphics card slot 212 is a PCIE slot, the clock signal CLK is named PCLK and generally oscillates at 100 MHz for reference by the physical layer interface PHY of each of the display chips 1 to N of the graphics card 200, for communication between the motherboard (host) 210 and the graphics card 200. Note that the clock signal CLK transferred by the graphics card slot 212 is received by the first clock buffer 202. The first clock buffer 202 couples the clock signal CLK to a plurality of output terminals thereof in parallel to be provided to the physical layer interfaces PHY of the display chips 1 to N. In an exemplary embodiment, the first clock buffer 202 uses fan-out communication to fan out the clock signal CLK. By different fan-out traces, the clock signals CLK are provided to the physical layer interfaces PHY of the display chips 1 to N. Note that the first clock buffer 202 further uses an additional fan-out trace to provide the clock synthesizer 204 with one fanned-out clock signal CLK.

The clock synthesizer 204 is operative to receive the clock signal CLK and thereby generates a local reference clock CLK_local for the internal operations of the graphics card 200. The clock synthesizer 204 may include operations such as frequency division, frequency doubling, or frequency locking and so on. In a case wherein a PCIE interface is used between the graphics card 200 and the motherboard 210, the 100 MHz clock signal PCLK may be transformed to a 27 MHz local reference clock CLK_local by the clock synthesizer 204. The undesirable jitter carried by the local reference clock CLK_local may be mitigated by the anti-jitter circuit 206. After being processed by the anti-jitter circuit 206, the local reference clock CLK_local is transformed to a clock signal CLK_local_adj. The anti-jitter circuit 206 outputs the clock signal CLK_local_adj to the second clock buffer 208 which has a plurality of output terminals and couples the clock signal CLK_local_adj to the output terminals in parallel. The clock signals CLK_local_adj outputted from the second clock buffer 208 are transferred to the phase locked loops PLLs of the display chips 1 to N in parallel. The phase locked loops PLLs are of identical design so that the generated display clocks DCLK (all based on the clock signal CLK_local_adj) are identical. In this manner, a set of display control units D11 to D1j of the display chip 1 to a set of display control units DN1 to DNj of the display chip N control their corresponding screens in accordance with the identical display clocks DCLK. Thus, from the first set of screens controlled by the display control units D11 to D1j to the last set of screens controlled by the display control units DN1 to DNj, all screens controlled by the graphics card 200 display images synchronously.

Note that the aforementioned fan-out communication may further be used to couple the clock signal CLK_local_adj to different terminals in parallel, and may further be used to couple the display clock DCLK to different terminals in parallel. The fan-out communication is not intended to limit the scope of the invention. Modifications may be made by a person skilled in the art without departing from the spirit or scope of the invention.

Figure 3:
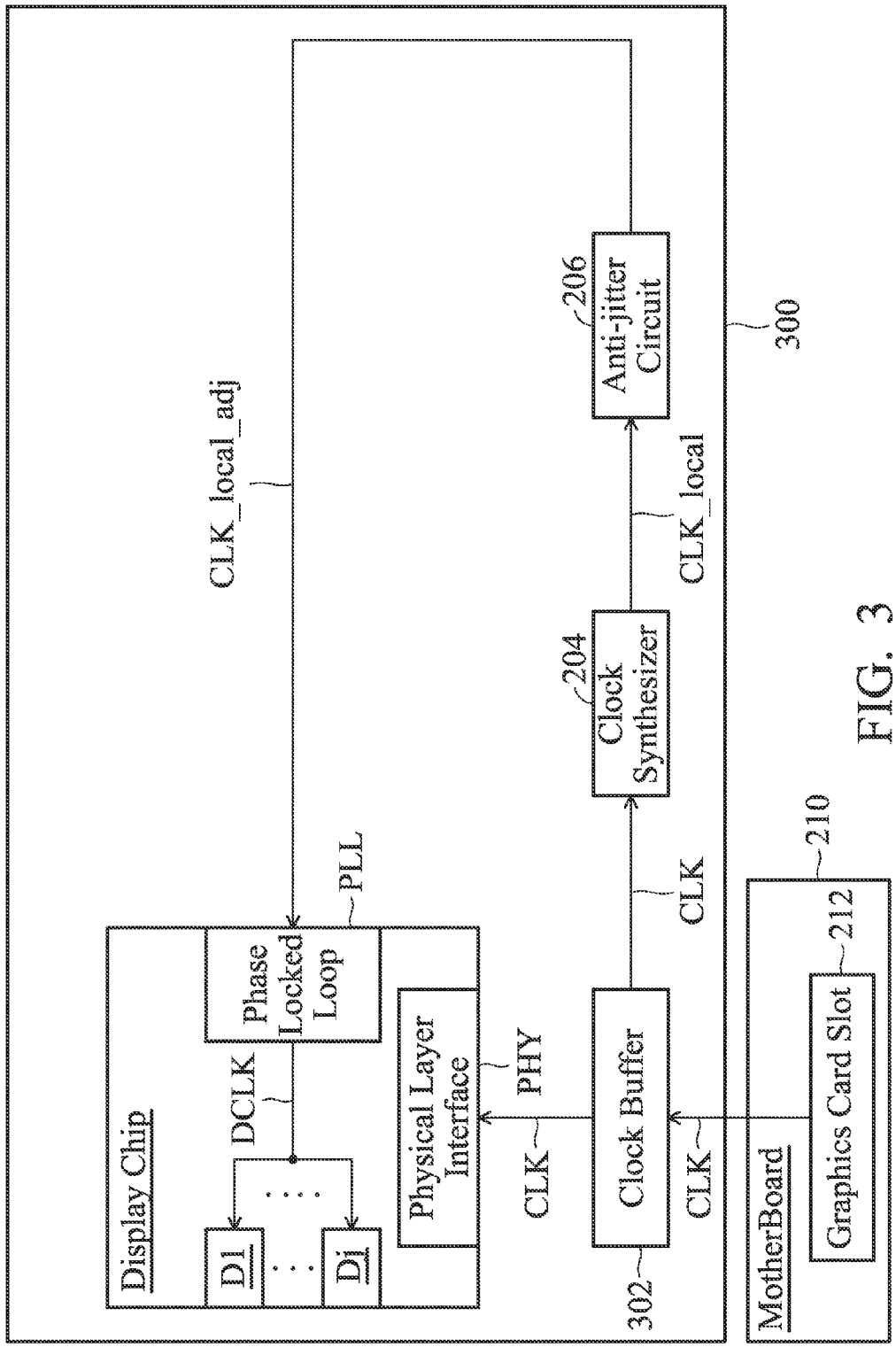
FIG. 3 depicts a graphics card containing just a single display chip.

Referring to the graphics card 200 of FIG. 2, it is a graphics card comprising a plurality of display chips 1 to N. In other embodiments, the disclosed graphics card may only comprise one single display chip. FIG. 3 depicts a graphics card 300 comprising one single display chip. In comparison with the graphics card 200, the graphics card 300 only requires one single clock buffer 302 because the graphics card 300 has only one single display chip. The clock buffer 302 receives the clock signal CLK from the graphics card slot 212 and couples the received clock signal CLK to the physical layer interface PHY of the single display chip and to the clock synthesizer 204. The local reference clock CLK_local generated by the clock synthesizer 204 is processed by the anti-jitter circuit 206 to mitigate the jitter impact of the local reference clock CLK_local and thereby a clock signal CLK_local_adj is generated. The clock signal CLK_local_adj may be transferred to the phase locked loop PLL of the single display chip directly, and the second clock buffer 208 of FIG. 2 is not required in the example of FIG. 3.

Based on the clock signal CLK_local_adj, the phase locked loop PLL of the display chip may generate a set of display clocks DCLK for the display control units D1 to Dj of the display chip. In this manner, the screens controlled by the display control units D1 to Dj display images in accordance with identical display clocks DCLK, and thereby synchronously display images.

Note that in the disclosed graphics card the clock signal CLK received via the graphics card slot (for the communication between the motherboard and the graphics card) is used to generate the local clock CLK_local. The clock signal CLK_ local_adj generated from the local reference clock CLK_local by jitter mitigation is transferred to the phase locked loops of the display chips of the graphics card to generate the display clocks DCLK to control the screens coupled to the graphics card and thereby achieve synchronous display on the screens. No local reference clock oscillator is required in such a design. It is one of the important features of the invention.

Note that the anti-jitter circuit 206 of FIG. 2 and FIG. 3 are optional. In other embodiments, there is no anti-jitter circuit in the graphics card.

Figure 4:
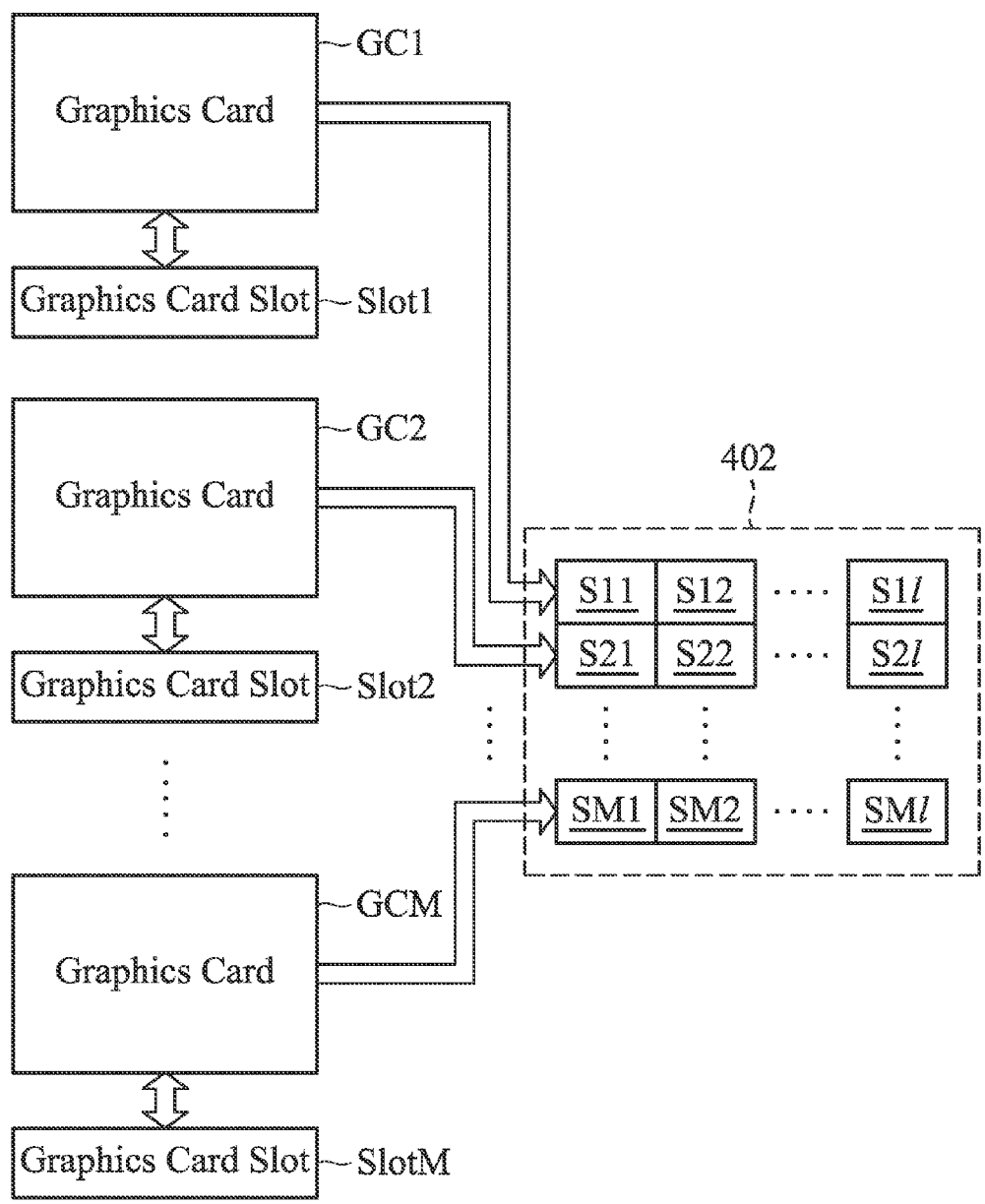
FIG. 4 depicts a multi-screen display system in accordance with an exemplary embodiment of the invention.

The disclosed graphics cards may be applied to a multi-screen display system. FIG. 4 depicts a multi-screen display system 400 in accordance with an exemplary embodiment of the invention.

The multi-screen display system 400 displays images by a video wall 402 consisting of a plurality of screens S11 to S1l, S21 to S2l . . . and SM1 to SMl. The motherboard of the central controller of the multi-screen display system 400 provides a plurality of graphics card slots Slot1 to SlotM attached by a plurality of graphics cards GC1 to GCM. Each graphics card controls a set of screens of the video wall 402 to display images. For example, the graphics card GC1 controls screens S11 to S1l, the graphics card GC2 controls screens S21 to S2l . . . and the graphics card GCM controls screens SM1 to SMl. The graphics card (e.g. GC1) may contain one single display chip (such as that shown in FIG. 3) or contain a plurality of display chips (such as that shown in FIG. 2). An example wherein the graphics card contains a plurality of display chips and each display chip contains a set of display control units for a set of screens is shown below. In the example, one display chip contains 4 display control units for 4 screens but the number of the screens S11 to S1*l* to be controlled by the graphics card GC1 is more than 4, for example, if l is 8 then two display chips are required in the graphics card GC1 to control the 8 screens S11 to S18.

Because the graphics cards GC1 to GCM are implemented by the disclosed graphics cards, the local reference clocks at these graphics cards GC1 to GCM are all generated from the same clock signal transferred from the motherboard via the graphics card slots Slot1 to SlotM. Because the clock synthesizers of different graphics cards are of identical design, the generated local reference clocks are identical. In this manner, all display chips of the graphics cards GC1 to GCM perform display control in accordance with synchronous display clocks generated from the synchronous local reference clocks. Thus, the first set of screens S11 to S1*l* . . . to the last set of screens SM1 to SM*l* controlled by the graphics cards GC1 to GCM display images synchronously. The video wall 402 is capable of displaying a perfect large image.

Note that the disclosed multi-screen display system is not limited to include a plurality of graphics card slots. For example, the disclosed multi-screen display system may comprise just one single graphics card slot. In such a case, a single graphics card attached on the single graphics card slot of the motherboard controls a plurality of screens to accomplish a multi-screen display.

Figure 5:
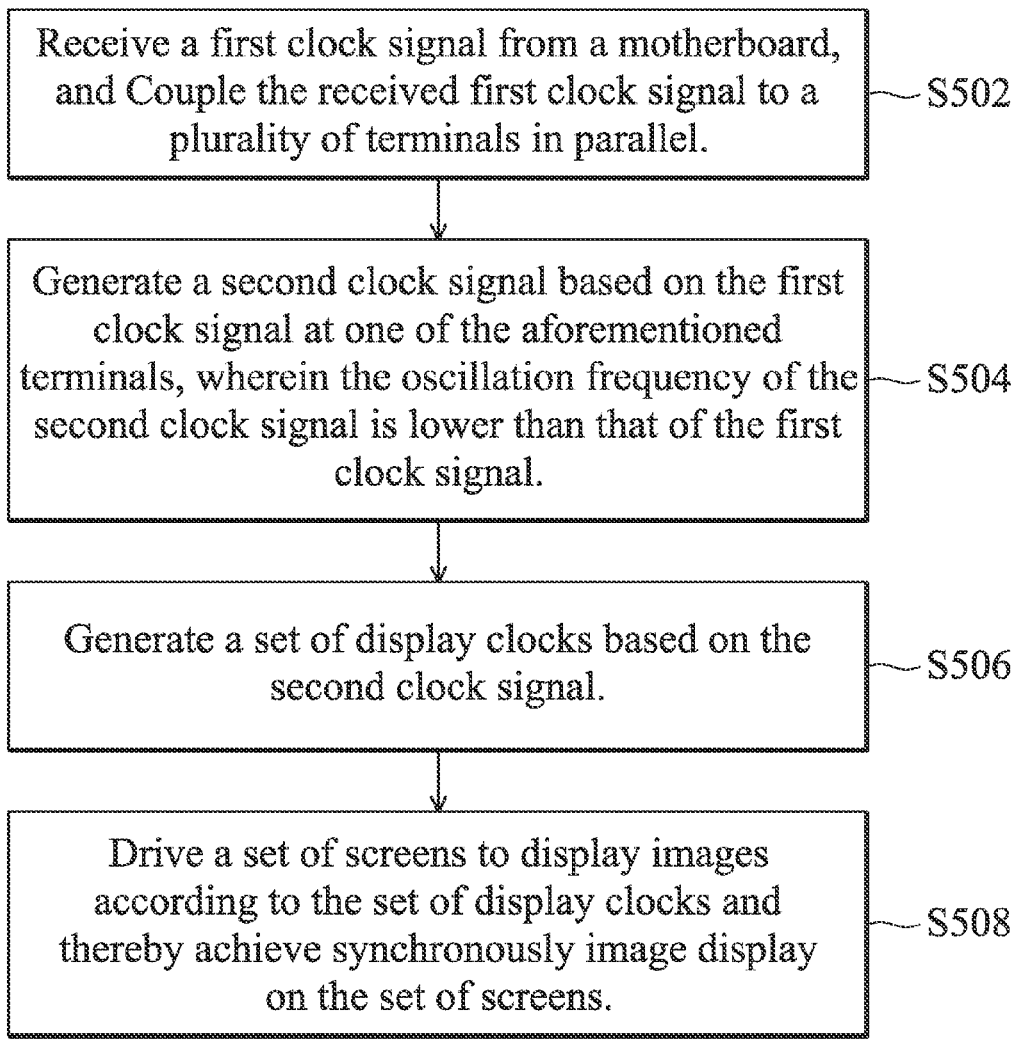
FIG. 5 is a flowchart depicting a multi-screen synchronous display method in accordance with an exemplary embodiment of the invention.

FIG. 5 is a flowchart depicting a synchronous display method for multiple screens, which may be implemented by a multi-screen display system having just one single graphics card or having more than one graphics card. In step S502, a first clock signal is received from a motherboard, and is coupled to a plurality of terminals in parallel. The first clock signal is typically used as a reference for communication between the motherboard and a graphics card attached on a graphics card slot of the motherboard. In step S504, a second clock signal is generated based on the first clock signal at one of the aforementioned terminals. Note that the oscillation frequency of the second clock signal is lower than that of the first clock signal. In step S506, a set of display clocks are generated based on the second clock signal. The generated display clocks may be the display clocks DCLK of the preceding discussion. In step S508, a set of screens are driven to display images according to the set of display clocks and thereby achieve synchronously image display on the set of screens.

Note that the aforementioned steps are not limited to specific devices. Any multi-screen display technology performing the aforementioned steps may involve the disclosure.

In another exemplary embodiment, an additional anti-jitter step between the steps S504 and S506 is shown. The second clock signal is further processed by an anti-jitter procedure before being used to generate the display clocks.

The multi-screen display technology of the invention uses one or more graphics cards to control a plurality of screens to display images synchronously. The graphics cards generate local reference clocks based on the same clock signal transferred from a motherboard via graphics card slots of the motherboard. The clock synthesizers of all graphics cards of the invention may be identical. The identical clock synthesizers generate identical local reference clocks, so that the plurality of screens controlled by the graphics cards display images synchronously. This allows a video wall to display a large image perfectly. In comparison with conventional techniques, the disclosed technique does not need a space for arrangement of cables that connect different graphics cards for multi-screen synchronous display, and the layout of the device is simpler. The distortion and noise interference of the cable clock and the split image problem of the conventional cable synchronous method do not appear in the disclosed technique.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A graphics card, comprising:
a first clock buffer, receiving a first clock signal from a motherboard to couple the first clock signal to a plurality of terminals in parallel;
a clock synthesizer, receiving the first clock signal from one of the plurality of terminals to generate a second clock signal; and
a second clock buffer, receiving the second clock signal and coupling the second clock signal to a plurality of terminals in parallel; and
a plurality of display chips, separately coupling to the plurality of terminals that the second clock buffer couples the second clock signal to and thereby each operating one set of screens for synchronous image display.

2. The graphics card as claimed in claim 1, wherein an oscillation frequency of the first clock signal is greater than that of the second clock signal.

3. The graphics card as claimed in claim 2, wherein the oscillation frequency of the first clock signal is 100 MHz while the oscillation frequency of the second clock signal is 27 MHz.

4. The graphics card as claimed in claim 1, wherein each display chip further comprises:
a phase locked loop, generating one set of display clocks based on the second clock signal; and
one set of display control units, controlling the corresponding set of screens to display images according to the first set of display clocks to display images synchronously.

5. The graphics card as claimed in claim 4, further comprising:
an anti-jitter circuit coupled between the clock synthesizer and the phase locked loops of the plurality of display chips, for performing an anti-jitter procedure on the second clock signal.

6. A multi-screen display system, comprising:
multiple sets of screens controlled by a first graphics card;
a motherboard; and
the first graphics card, comprising:
a first clock buffer, receiving a first clock signal from the motherboard and coupling the received first clock signal to a plurality of terminals in parallel;
a clock synthesizer, receiving the first clock signal that the first clock buffer provided at one of the plurality of terminals to generate a second clock signal;
a second clock buffer, receiving the second clock signal and coupling the second clock signal to a plurality of terminals in parallel; and
a plurality of display chips, separately coupling to the plurality of terminals that the second clock buffer couples the second clock signal to and thereby each operating one set of screens for synchronous image display.

7. The multi-screen display system as claimed in claim 6, wherein an oscillation frequency of the first clock signal is greater than that of the second clock signal.

8. The multi-screen display system as claimed in claim 7, wherein the oscillation frequency of the first clock signal is 100 MHz and the oscillation frequency of the second clock signal is 27 MHz.

9. The multi-screen display system as claimed in claim 6, wherein each display chip further comprises:
   a phase locked loop, generating one set of display clocks based on the second clock signal; and
   one set of display control units, referring to the set of display clocks to control the corresponding set of screens to display images synchronously.

10. The multi-screen display system as claimed in claim 9, wherein the first graphics card further comprises:
    an anti-jitter circuit coupled between the clock synthesizer and the phase locked loops of the plurality of display chips on the first graphics card, to performs an anti-jitter procedure on the second clock signal.

11. The multi-screen display system as claimed in claim 6 which further comprises:
    a second graphics card and multiple sets of screens controlled by the second graphics card,
    wherein, the second graphics card comprises:
    a third clock buffer, receiving the first clock signal from the motherboard, and coupling the received first clock signal to a plurality of terminals in parallel;
    a clock synthesizer, receiving the first clock signal provided at one of the plurality of terminals by the third clock buffer to generate a third clock signal synchronous to the second clock signal;
    a fourth clock buffer, receiving the third clock signal and coupling the third clock signal to a plurality of terminals in parallel; and
    a plurality of display chips, separately coupling to the plurality of terminals that the fourth clock buffer couples the third clock signal to and thereby each operating one set of screens for synchronous image display.

12. The multi-screen display system as claimed in claim 11, wherein each display chip further comprises:
    a phase locked loop, using the second or the third clock signal to generate one set of display clocks; and
    one set of display control units, referring to the set of display clocks to control the corresponding set of screens to display images synchronously.

13. A synchronous display method for a plurality of screens which is implemented by a single graphics card, comprising:
    using the single graphics card to receive a first clock signal from a motherboard and coupling the first clock signal to a plurality of terminals in parallel;
    generating a second clock signal based on the first clock signal provided at one of the plurality of terminals;
    receiving the second clock signal and coupling the second clock signal to a plurality of terminals in parallel; and
    coupling a plurality of display chips, respectively, to the plurality of terminals providing the second clock signal and thereby each display chip operating one set of screens for synchronous image display, wherein the plurality of display chips are provided within the single graphics card.

14. A synchronous display method for a plurality of screens which is implemented within a multi-screen display system having a plurality of graphics cards, comprising:
    using the graphics cards to receive a first clock signal from a motherboard and, in each of the graphics cards, the received first clock signal is coupled to a plurality of terminals in parallel;
    using the graphics cards to generate second clock signals, respectively, wherein in each of the graphics cards, the second clock signal is generated in accordance with the first clock signal provided at the plurality of terminals within the graphics card, wherein an oscillation frequency of the first clock signal is greater than that of the second clock signal;
    using the graphics cards to generate sets of display clocks, respectively, wherein in each of the graphics card, the second clock signal generated therein is used to generate the set of display clocks corresponding thereto; and
    using the graphics cards to control sets of screens, respectively, wherein for each of the graphics cards, the control of the set of screens corresponding thereto is based on the set of the display clocks generated by the graphics card to achieve synchronous image display of the set of screens.

* * * * *